(12) United States Patent
Demizu et al.

(10) Patent No.: US 11,198,515 B2
(45) Date of Patent: Dec. 14, 2021

(54) METHOD AND SYSTEM FOR DISTRIBUTED ELECTRICAL LOADS CONNECTED TO SHARED POWER SOURCES

(71) Applicant: Embraer S.A., São José dos Campos-SP (BR)

(72) Inventors: Ricardo Takeshi Demizu, São José dos Campos (BR); Júlio Cesar Graves, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 35 days.

(21) Appl. No.: 16/567,206

(22) Filed: Sep. 11, 2019

(65) Prior Publication Data

US 2020/0079520 A1 Mar. 12, 2020

Related U.S. Application Data

(60) Provisional application No. 62/729,790, filed on Sep. 11, 2018.

(51) Int. Cl.
| | |
|---|---|
| *B64D 35/02* | (2006.01) |
| *B60L 50/60* | (2019.01) |
| *B64C 29/00* | (2006.01) |
| *B60L 53/62* | (2019.01) |
| *B64D 27/24* | (2006.01) |
| *B64D 35/04* | (2006.01) |

(52) U.S. Cl.
CPC ............. *B64D 35/02* (2013.01); *B60L 50/66* (2019.02); *B60L 53/62* (2019.02); *B64C 29/0025* (2013.01); *B64D 27/24* (2013.01); *B64D 35/04* (2013.01); *B60L 2200/10* (2013.01); *B64D 2221/00* (2013.01)

(58) Field of Classification Search
CPC .... B64D 35/02; B64D 27/24; B64D 2221/00; B60L 50/66; B60L 53/62; B60L 2200/10; B60L 60/60; B64C 29/0025; B64C 29/00
See application file for complete search history.

(56) References Cited

U.S. PATENT DOCUMENTS

| | | | |
|---|---|---|---|
| 2013/0099560 | A1 | 4/2013 | Shipley et al. |
| 2016/0052626 | A1 | 2/2016 | Mey |
| 2020/0010187 | A1* | 1/2020 | Bevirt ................. B64C 29/0033 |

FOREIGN PATENT DOCUMENTS

| | | |
|---|---|---|
| CN | 106203854 A | 12/2016 |
| WO | 2017197245 A1 | 11/2017 |

OTHER PUBLICATIONS

Extended European Search Report issued in European Application No. 19196759.5 dated Jan. 8, 2020 (26 pages).

\* cited by examiner

*Primary Examiner* — Robert L Deberadinis
(74) *Attorney, Agent, or Firm* — Nixon & Vanderhye PC

(57) ABSTRACT

Methodologies to deal with electrical systems and power source failures for electric vertical takeoff and landing aircraft (eVTOL) design with distributed propulsion using multiple electric motors minimize required power source energy to perform an emergency landing procedure. Interconnecting electric loads and power sources in the "Ring Topology" concept considers combination of electric loads and power sources in order to reduce the impact on the loss of a power source, as well as to better utilize the remaining energy of the remaining power sources if any load becomes unavailable.

16 Claims, 9 Drawing Sheets

– Set of batteries according to the electric motors quantity

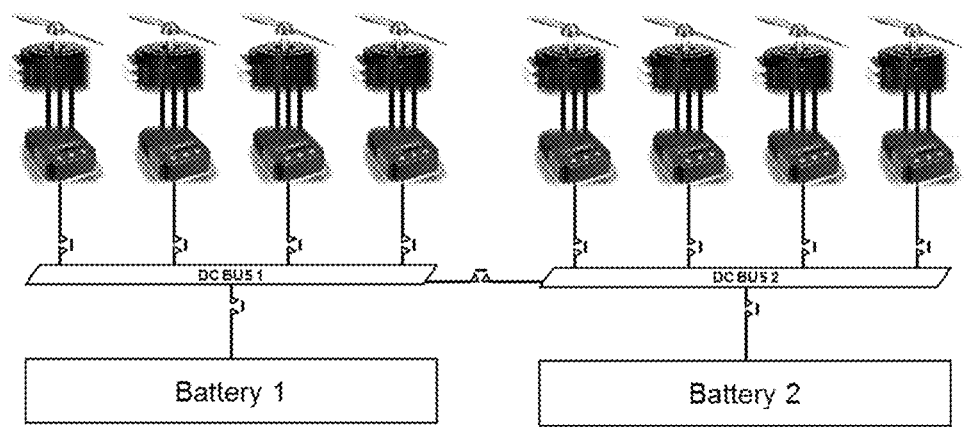
Figure 1 – Dual Battery Configuration (Prior Art)
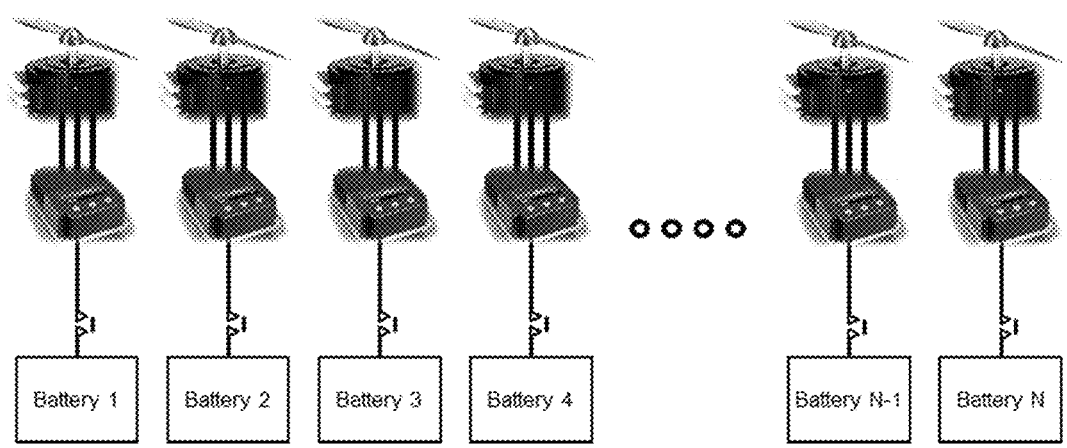
Figure 2 – One battery for each electric motor (Prior Art)
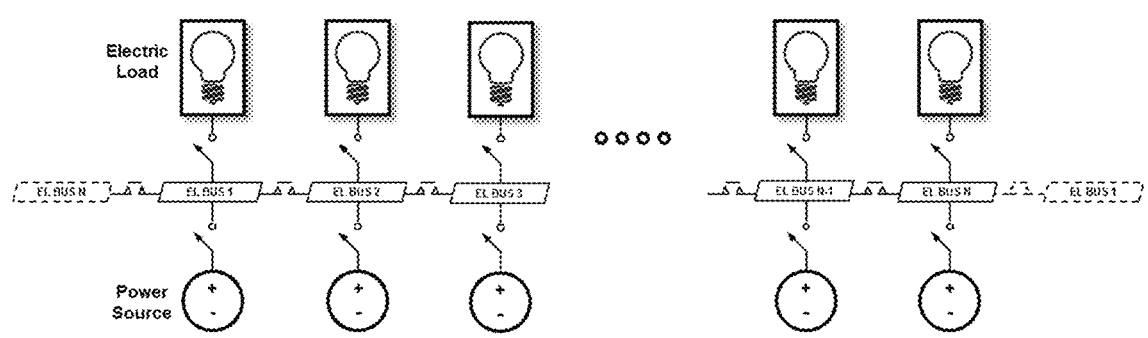
Figure 3 - Ring topology

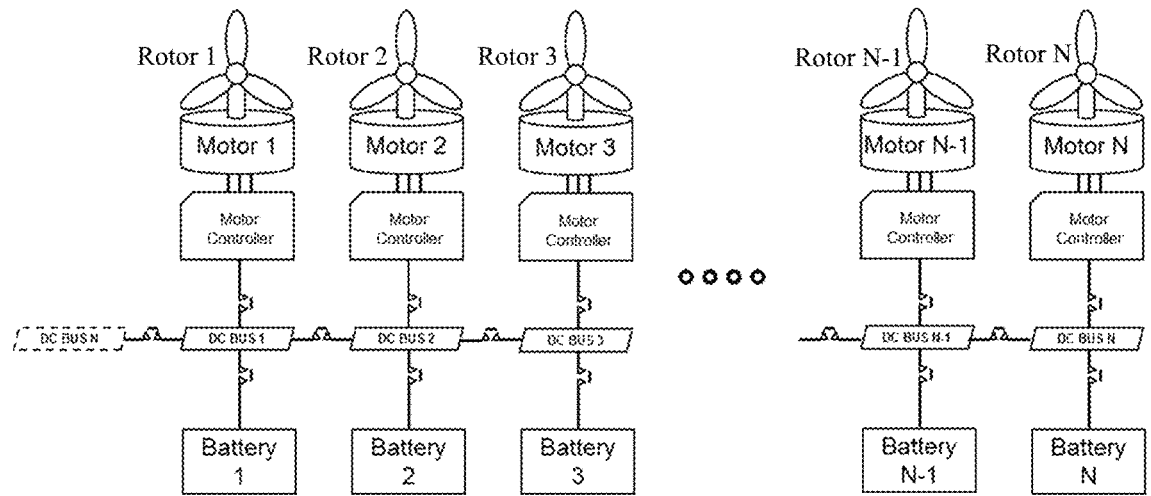
Figure 4 – Set of batteries according to the electric motors quantity
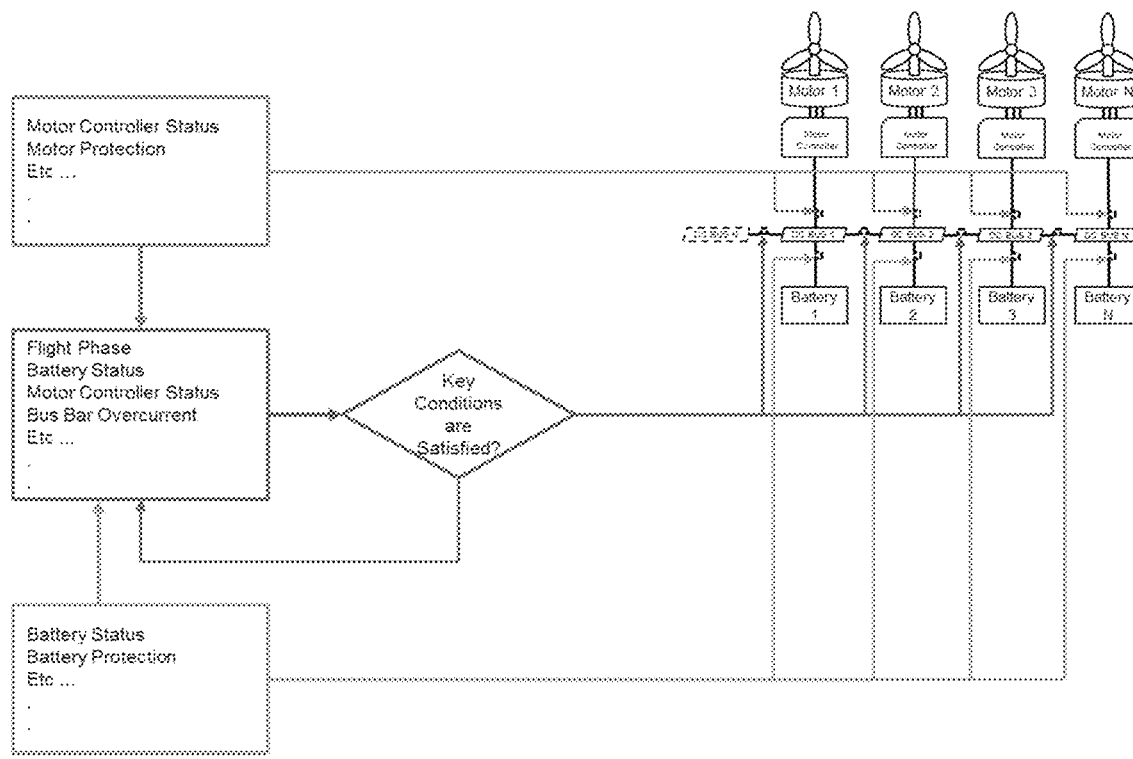
Figure 5 – Operation Logic Flowchart

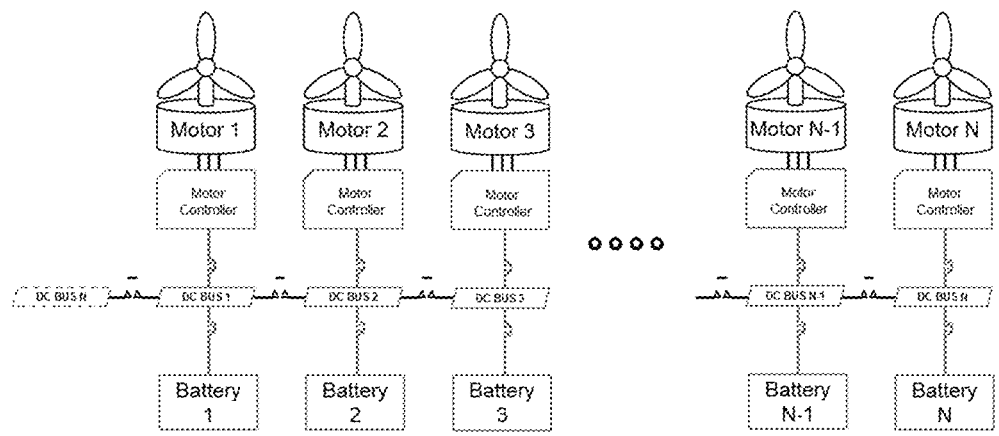
Figure 6 – Set of Batteries in Isolated Channels
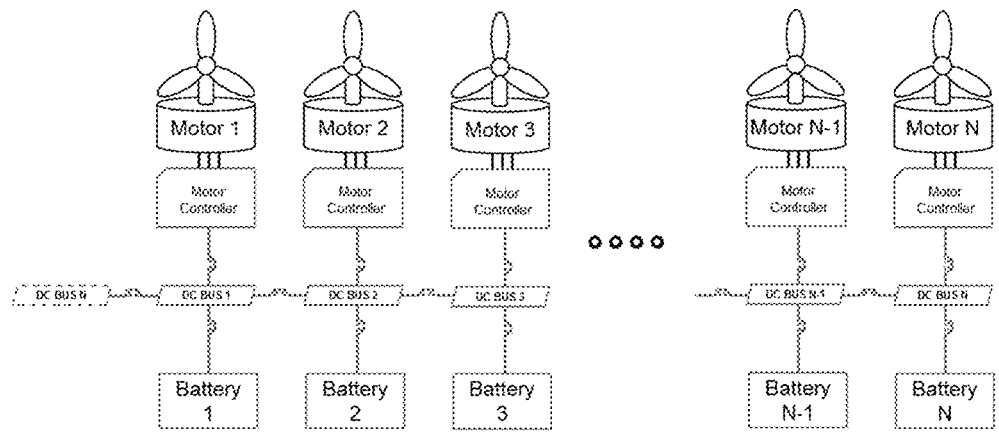
Figure 7 – Set of Batteries in Integrated Channels

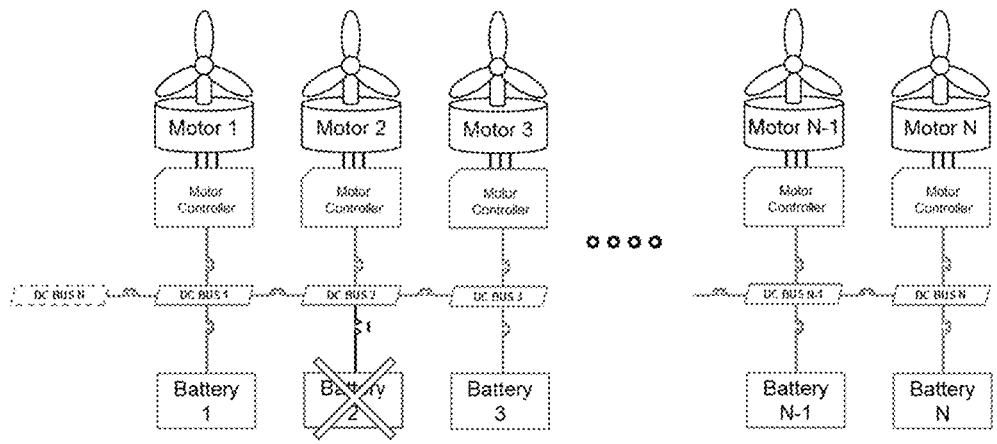
Figure 8 – One Battery Fail Channels
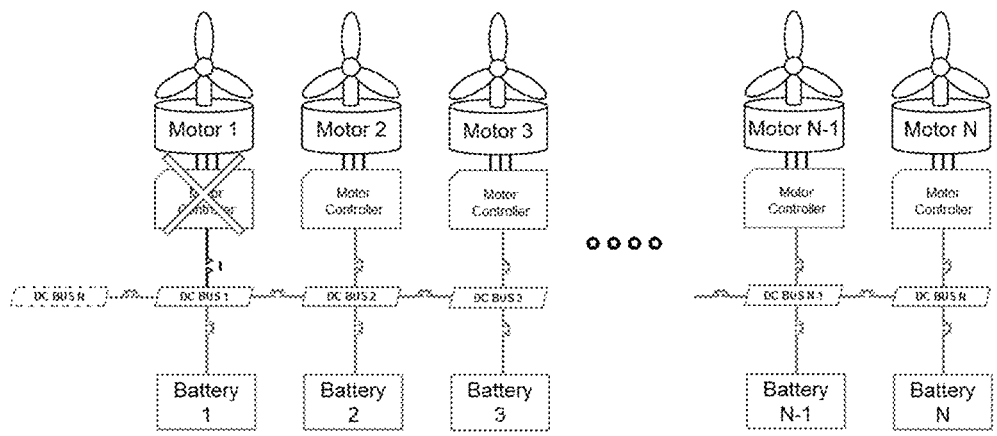
Figure 9 – Propulsion Channel Lost

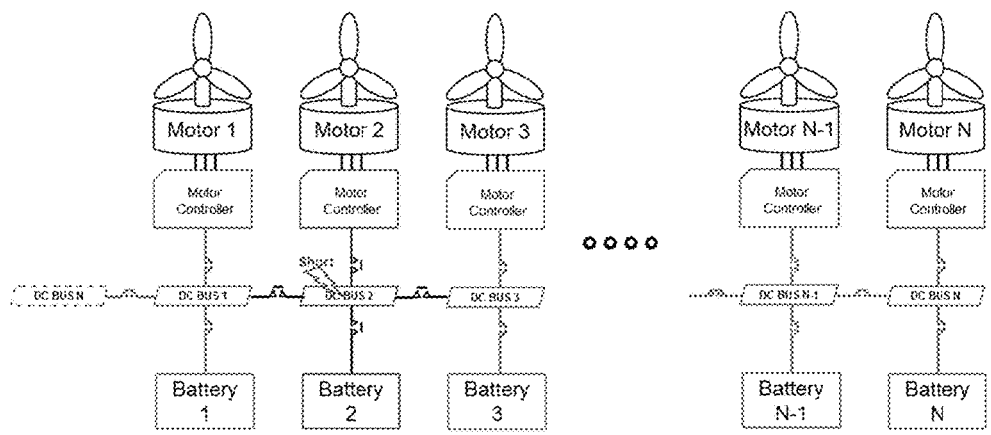
Figure 10 – Bus Bar Short Circuit
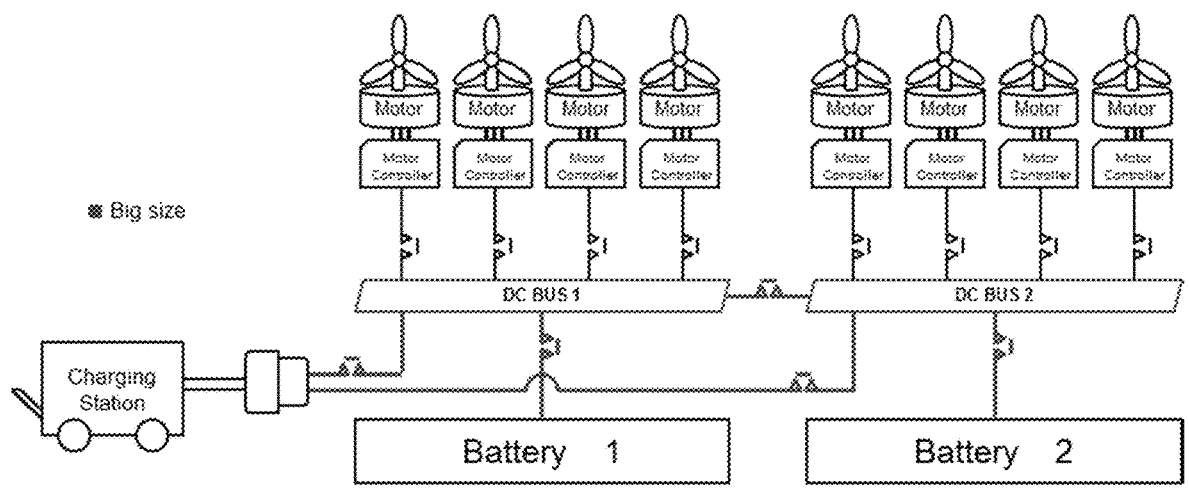
Figure 11 – Big Size Components (Prior Art)

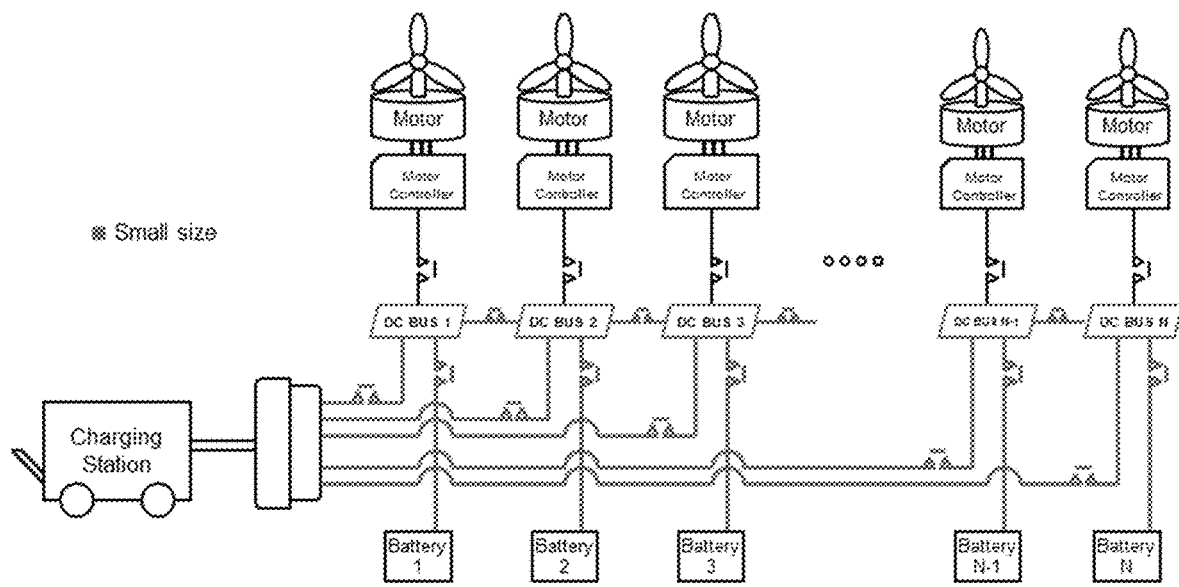
Figure 12 – Small Size Components - Battery with Single Charge/Discharge Connection
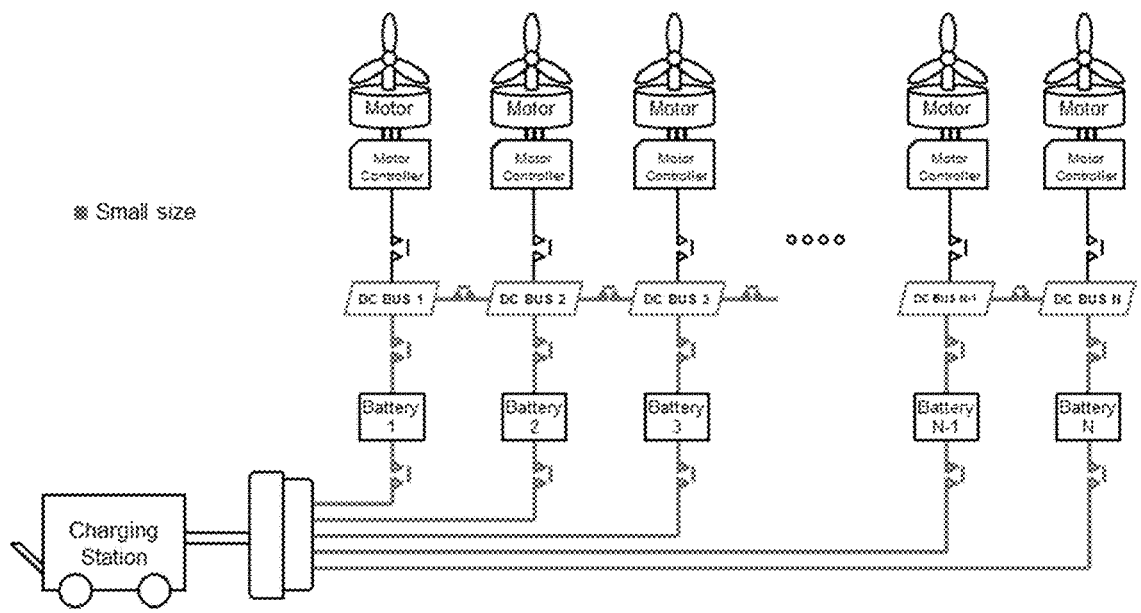
Figure 13 – Small Size Components - Battery with Charge Input and Discharge Output Connections

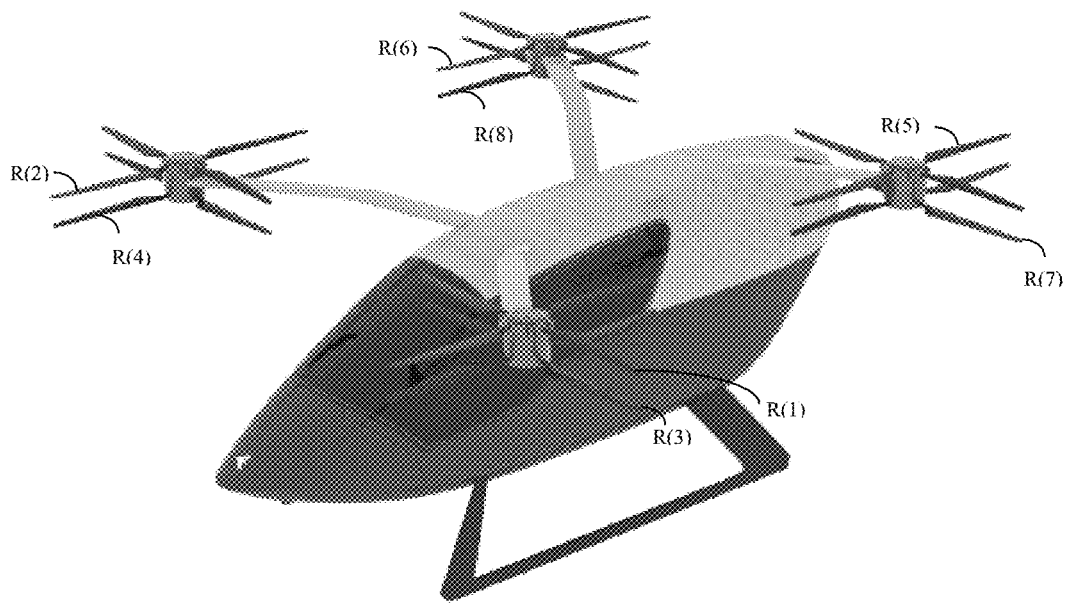
Figure 14 – E-VTOL with Eight Propeller for Hover and for Cruise
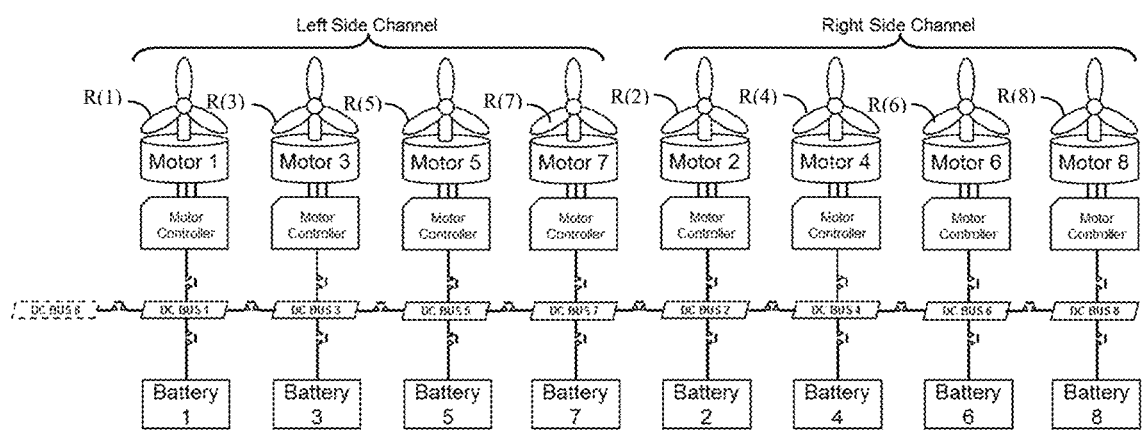
Figure 15 – Eight Sets of Batteries Architecture for Eight Motors

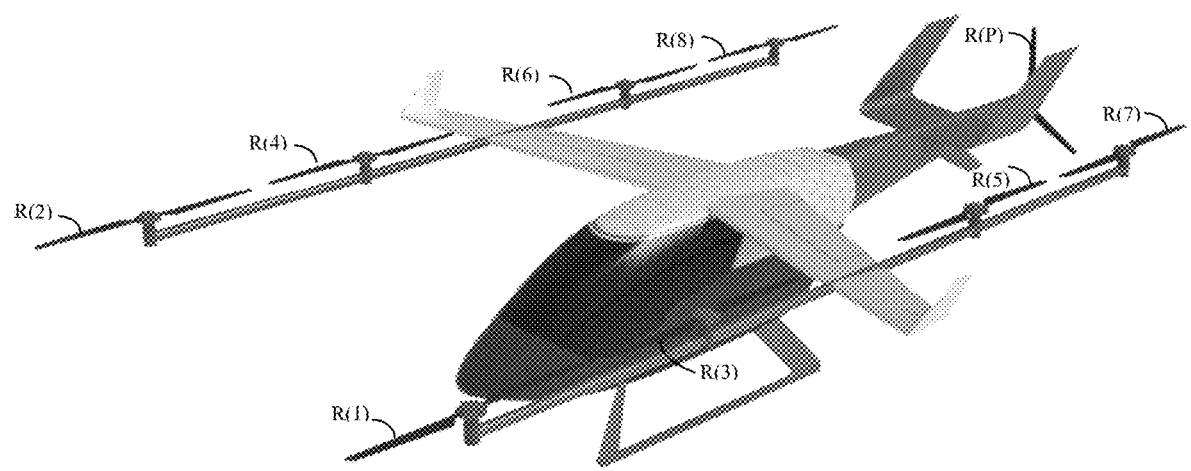
Figure 16 – E-VTOL with Eight Propeller for Hover and One for Cruise
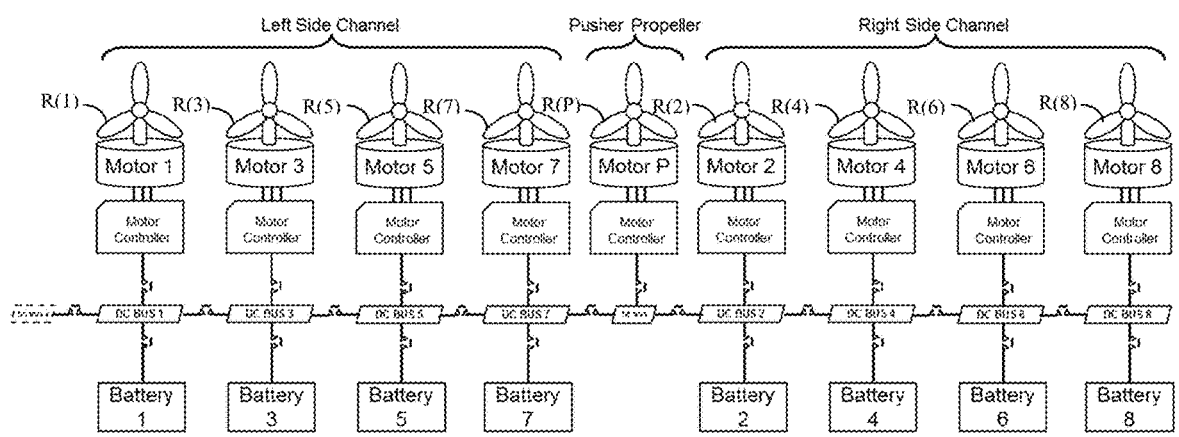
Figure 17 – Eight Sets of Batteries Architecture for Nine Motors

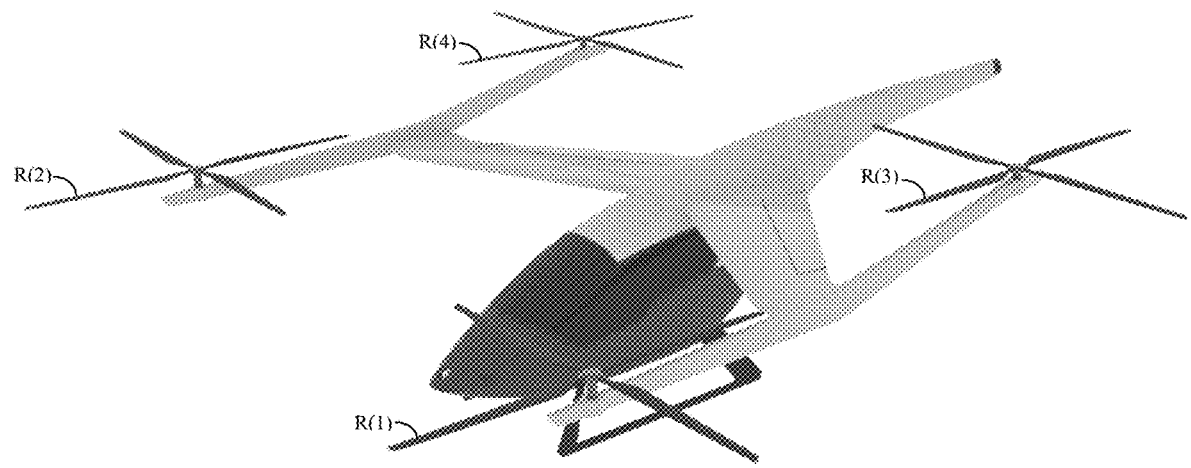
Figure 18 – E-VTOL with Four Propeller for Hover and for Cruise
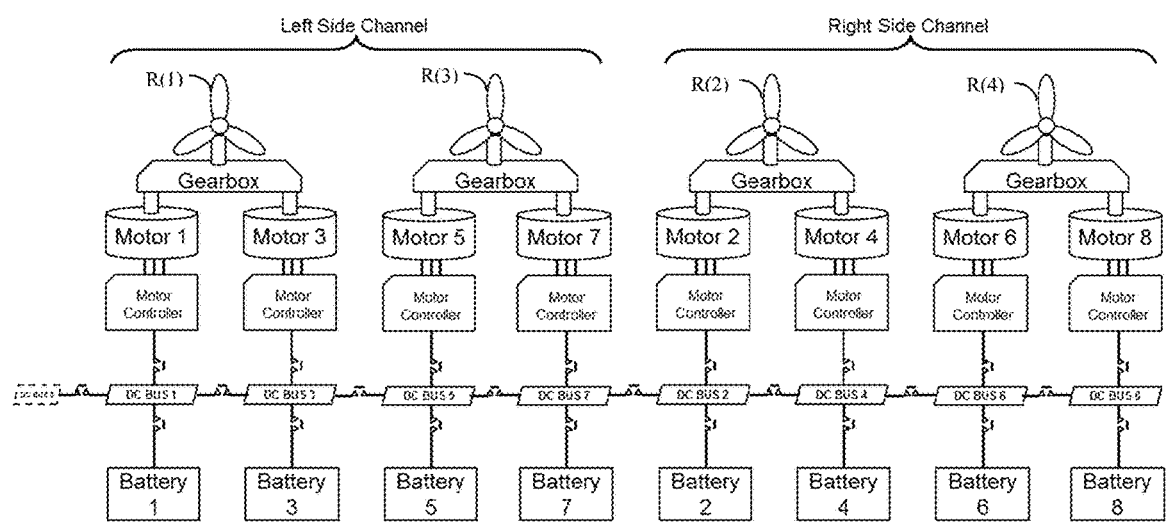
Figure 19 – Eights Set of Batteries Architecture for Eight Motors

METHOD AND SYSTEM FOR DISTRIBUTED ELECTRICAL LOADS CONNECTED TO SHARED POWER SOURCES

CROSS-REFERENCE TO RELATED APPLICATIONS

This application claims benefit of U.S. Provisional Application No. 62/729,790 filed Sep. 11, 2018, incorporated herein by reference.

STATEMENT REGARDING FEDERALLY SPONSORED RESEARCH OR DEVELOPMENT

None.

FIELD

The technology herein relates to connection arrangements for an electric Vertical Take-off and Landing (e-VTOL) vehicle, considering the batteries as the sole propulsion power sources and electric motors as loads connected to these energy sources. The present technology also relates to a method and a system, which consider combination(s) of loads and sources of electric energy in order to reduce the impact on the loss of a source of energy, as well as to better utilize the remaining energy of the energy sources if any load becomes unavailable.

BACKGROUND

The concept of vertical flight has been known for many hundreds of years. Leonardo da Vinci sketched a vertical take-off and landing (VTOL) aircraft in one of his notebooks. The ubiquitous helicopter (a kind of VTOL) is used for many applications including personnel transport, cargo delivery, observation, traffic safety, rescue missions, hospital airlifts and many other situations where there is not enough horizontal space for a runway.

Recently, there has been great interest in electric and/or hybrid-electric powered vertical takeoff and landing (e-VTOL) aircrafts. Such electric aircraft use electric motors and batteries instead of internal combustion engines, and thus offer advantages of less noise pollution and emissions, mechanical efficiency and lower operating expenses due to reduced fuel and maintenance costs.

A typical e-VTOL uses on-board electric batteries and motors for propulsion. Many e-VTOL designs differ from a traditional helicopter due to possibility of having a distributed propulsion using a configuration of multiple electric motors instead of a single rotor driven by a combustion engine, creating a better safety approach. This is consistent with an approach often taken in the aerospace world of providing redundancy to critical systems to give an adequate level of safety and fault tolerance. Such redundancy must typically still take into account that the project has to be efficient and not be oversized.

Despite having distributed propulsion, many e-VTOL multi-copter configurations are not able to remain stable and controllable when one or more rotors/motors fails. This poses a safety, operational and certification challenge for multi-copters intended to carry important payloads and/or people.

As part of failure combination in the propulsion system, during a battery failure scenario an e-VTOL should maintain stability, controllability, and the ability to use remaining energy to ensure a safe landing. Technical problems such as the following need to be addressed:

1. The loss of one battery, leading to a loss of one or more electric motor;
2. Dead (over)weight of the battery system in occurrence of (1); and
3. Providing enough remaining energy to perform an emergency landing in occurrence of (1).

One obvious solution to such technical problems, according to the prior art, is to provide twice as much energy as is required, using two (redundant) battery sets or banks. In one configuration, the first battery bank acts as backup to the second battery bank (active and standby). In another configuration, both battery sets or banks feed, at the same time, two different propulsion channel (FIG. 1). In both cases, the provision of double the energy required leads to a big penalty in weight.

Considering a minimum weight solution, i.e. using exactly the required battery energy, another possible solution is to divide the total energy between two battery sets operating as indicated previously. Upon one battery failing, the system reconfigures to require twice the normal discharge rate from remaining battery, with half of the normal available energy. This leads to a big penalty in the time remaining to perform an energy landing.

Another way to minimize the loss of one motor due to electrical systems and power supply failure is to have a dedicated battery for each electric motor (see prior art FIG. 2). This approach maximizes the distribution of batteries and motors; each battery/motor pair operates independently of every other battery/motor pair, so the failure of one battery/motor pair has no effect on the operation of the other battery/motor pairs.

There is still a problem of weight or energy optimization. In case of the failure of one battery, the remaining batteries must be able to cover the additional power demand from the remaining motors to compensate for the absence of the failed channel (battery/motor pair). Therefore, each battery needs to be provisioned with sufficient extra energy (causing extra weight), or the remaining energy can be low for an emergency landing procedure.

Making a simple comparison, batteries for e-VTOLs are equivalent to fuel systems in traditional helicopters, even though electric batteries can cope better with distributed propulsion. However, fuel systems have a long history, and a very mature technology compared with the electric battery for this application, and typically provide a higher energy density given more fuel-efficient internal combustion engines.

BRIEF DESCRIPTION OF THE DRAWINGS

The following detailed description of exemplary non-limiting illustrative embodiments is to be read in conjunction with the drawings of which:

FIG. 1 shows a prior art dual battery configuration;

FIG. 2 shows a prior art arrangement providing a battery for each electric motor;

FIG. 3 shows ring topology according to the present technology;

FIG. 4 shows a set of batteries corresponding to quantity of the electric motors;

FIG. 5 shows an example non-limiting operation logic flowchart;

FIG. 6 shows a set of batteries in isolated channels;

FIG. 7 shows a set of batteries in integrated channels;

FIG. 8 shows a scenario in which one battery channel fails;

FIG. 9 shows a scenario with a lost propulsion channel;

FIG. 10 shows an example bus bar short circuit;

FIG. 11 shows prior art oversized components;

FIG. 12 shows example non-limiting small sized components including batteries with single charge/discharge connections;

FIG. 13 shows example non-limiting small size components in a configuration including batteries with charge input and discharge output connections;

FIG. 14 shows an example non-limiting E-VTOL with eight propellers for hover and for cruise;

FIG. 15 shows an example non-limiting architecture providing eight sets of batteries for eight motors of the FIG. 14 example E-VTOL;

FIG. 16 shows an E-VTOL with eight propellers for hover and one for cruise;

FIG. 17 shows an example non-limiting architecture including eight sets or banks of batteries for the nine motors of the FIG. 16 E-VTOL;

FIG. 18 shows an example non-limiting E-VTOL with four propellers for hover and for cruise; and FIG. 19 shows an example non-limiting architecture including eight sets of batteries for the eight motors of the FIG. 18 E-VTOL.

DETAILED DESCRIPTION OF PREFERRED EMBODIMENTS

One non-limiting embodiment of present technology addresses methodologies to deal with electrical systems and power source failures for e-VTOLs design with distributed propulsion using multiple electric motors. The technology is concerned with minimizing required power source energy to perform an emergency landing procedure.

One aspect of the present technology provides methods and systems to interconnect electric loads and power sources in a "Ring Topology," which considers combinations of electric loads and power sources in order to reduce the impact on the loss of a power source, as well as to better utilize the remaining energy of the remaining power sources if any load becomes unavailable.

The example non-limiting technology provides not only a redundant path(s) in case of battery failure, but also a connection arrangement to provide a high autonomy after a battery and/or electric motor failure.

The example non-limiting technology also considers a particular arrangement where the electric current flow to the battery during charging condition is limited according to a maximum single battery set capacity.

For the purpose of the example technology herein, example non-limiting embodiments of a "battery" comprises an association, combination or bank of plural (e.g., in some cases, a high number of) individual battery cells, to provide required energy for e-VTOL, with a conventional Battery Management System (BMS), cooling system, and containment design.

Initially, a nominal combination is at least one Electric Load and at least one Power Source connected in each Electric Bus with possible different combinations. The Ring Topology shown in FIG. 3 connects each Electric Bus (N buses) in a chain configuration, allowing adjacent batteries to interconnect with each other or alternatively to be isolated from each other, as defined by control logic (e.g., a processor, an ASIC, etc.) that determines the exact moment to segregate one component of a proposed net, to interconnect them, or to isolate the ring. Specifically, the ring topology of FIG. 3 shows bus bars B1, B2, B3, . . . BN−2, BN. Switches are disposed between each bus bar to selectively connect each bus bar to an adjacent bus bar or to disconnect each bus bar from an adjacent bus bar. Switches selectively connect or disconnect each load L1, L2, LN to/from associated bus bars B1, . . . , BN. Additional switches selectively connect or disconnect each power source P1, P2, . . . PN to/from associated bus bars B1, . . . BN. The topology is termed "ring" because bus bar BN can be selectively connected to bus bar B1 (as shown in dotted) to provide a continuous "ring" of bus bars. In this context, N can be any positive integer greater than 1.

More specifically, for an example non-limiting e-VTOL application, electrical loads could comprise electric motors and power sources could comprise batteries or other types of electric power source such as capacitors, solar panels, fuel cells or the like. Still more specifically, one electric motor and one battery are connected in each electric bus.

Another non-limiting aspect of embodiments of present technology comprise a method and an architecture (system) combining battery redundancy and interconnections. The main idea is to split the total energy required in several battery sets and interconnect these sets to:

Minimize the probability of losing an electric motor, improving vehicle safety;

Minimize battery overweight to better tolerate the occurrence of one battery failure;

Maximize remaining energy to perform a landing emergency procedure in case of a battery failure, improving time to react and energy availability;

Isolate internal distribution faults, granting as many electric motors as possible available during emergency procedures.

Optimize power feeders and connection bus bars considering battery charge and discharge rates.

One example non-limiting method of the present technology splits the total energy across N batteries to supply individually N motors and to interconnect the batteries using a ring topology as discussed above (N electric motors configuration shown in FIG. 4). Control logic determines the exact moment to segregate one component of the proposed net, to interconnect the component to an adjacent component(s) in the ring, or to isolate the ring.

FIG. 5 shows an example non-limiting Operation Logic Flowchart. This flowchart can be performed for example by a processor connected to a non-transitory memory storing a sequence of executable instructions. As shown in FIG. 5, the processor initially (prior to takeoff of the vehicle) performs operations relating to motor controller status, motor protection, etc. and in response can control switches that selectively connect motors/motor controllers to be powered by associated bus bars. The processor also continually monitors battery status, battery protection, etc. and is able to selectively disconnect batteries from associated bus bars to isolate the batteries from the bus bars.

The processor during the flight phase monitors battery status, motor controller status, bus bar overcurrent conditions, etc. If key conditions are not satisfied (i.e., if failure of a component is detected), the processor performs control operations to adaptively reconfigure the ring topology to isolate failed components from other components and/or to selectively interconnect non-failed components together (e.g., so that one or more non-failed battery can power a motor to compensate for a failed battery and/or so that one or more non-failed battery can power a different motor to compensate for a failed motor).

For instance, during a normal operation, each battery feeds its own motor without connecting through the ring. This is an "isolate channel architecture" shown in FIG. 6 in which each switch between each pair of buses on the ring is an open circuit. See also in FIG. 6 that each switch between each battery and each bus is closed and each switch between each bus and each motor is also closed, thereby providing respective connections between battery-motor pairs but maintaining electrical isolation between each battery-motor pair and all other battery-motor pairs.

It is also possible to connect/configure the ring to equilibrate battery levels The FIG. 7 "Integrated channels architecture" shows that each switch between each adjacent pair of buses is closed. See also in FIG. 7 that each switch between each battery and each bus is closed and each switch between each bus and each motor is also closed. This has the effect of connecting all batteries in parallel with one another, and all motors in parallel with one another, so that one large battery bank supplies power to all motors connected in parallel.

In case of a battery failure, the control logic will reconfigure all interconnections to isolate the failed component and supply all motors using N−1 batteries as shown in FIG. 8. The consequence of this proposed reconfiguration is the loss of 1/N of remaining energy and a minimal increase in discharge rate of each battery since the additional load is distributed evenly across all remaining non-failed batteries.

According to one non limiting example of the present technology, a "propulsion channel" means a channel formed by at least one motor controller, at least one motor and the respective rotor. In this context, a rotor is a combination of several rotary wings (rotor blades) and a control system that generates the aerodynamic lift force that supports the weight of the vehicle and/or supplies thrust to counteract aerodynamic drag in forward flight. The respective propulsion channel may be lost in case of failure of a motor controller, a motor or a rotor. If a propulsion channel is lost, the control logic configures the net (ring topology) to isolate the faulty propulsion channel and all non-failed batteries supply all remaining non-failed motors. During this case of failure, all remaining motors and respective rotors are operating in overload. However, as FIG. 9 shows, the total available energy remains the same as well as each battery discharge rate. In particular, the capacity of battery 1 is not wasted but is instead connected to help power the remaining motors 2-N. Meanwhile, some or all of these remaining motors 2-N may need to provide more power than normal to compensate for the loss of motor 1.

In case of an internal bus bar short circuit, the control logic can isolate the short-circuited bus bar, the respective battery and the respective propulsion channel as FIG. 10 shows by opening all the switches connecting the shorted bus bar. This isolated configuration has the effect of disabling motor 2 and battery 2. Thus, compared with the FIG. 1 design, the effect of one bus bar short circuit in the proposed FIG. 10 solution leads to loss of one battery (with 1/N of available energy) and one propulsion channel (with 1/N of total power), instead of one battery (with half of available energy) and 4 motors (with half of the installed power). The result is that an e-VTOL using the FIG. 1 design will likely crash whereas an e-VTOL using the FIG. 10 design will be able to land safely.

Example Non-Limiting Battery Charging

Example non-limiting embodiments also consider a particular arrangement where current flow to a battery during a charging condition is limited according to the maximum single battery set capacity.

Also, the non-limiting embodiments overcome disadvantages of the FIG. 2 design in which (as shown in prior art FIG. 11) the size of bus bar and the feeder cable connected this bus bar and to the battery are very large bulky, bringing challenges related to installation such as cable bend ratios, brackets, bus bar segregation, etc.

As FIG. 12 shows, the proposed architecture provided by example embodiments herein can split the charging cable according to the battery banks and reduce the size of each cable and bus bar, facilitating the installation. In particular, a charging station is able to supply power individually to each battery bank 1-N through smaller individual charging cables. The charging cable are connected to respective DC bus bars 1, 2, . . . N−1, N, which in turn isolate the motors during charging and selectively connect associated battery banks 1, 2, . . . , N−1, N. The control logic can monitor charge state and once a particular battery is charged, control the associated bus bar to disconnect that battery from the charger to avoid overcharging. As FIG. 13 shows, in an alternative configuration, the charging cables are selectively connected directly to the battery banks, and the control logic controls individual switches for each battery bank to avoid overcharging.

EXAMPLES

FIGS. 14 and 15 represent a non-limiting embodiment of described technology with eight propulsion channels for hover and for cruise with Direct Drive and Fixed Pitch. In other words, in this configuration, each of the eight propulsion channels is used both for hover and cruise operations. FIG. 15 shows locating the left side propulsion channels connected in the ring topology so that motors 1 and 3 power co-axial rotors R(1), R(3) and batteries 1 and 3 are adjacent in the ring, etc., and similarly motors 2 and 4 power co-axial rotors R(2), R(4) and batteries 2 and 4 are adjacent in the ring, etc. This example configuration permits each rotor R to be operated by an associated motor/battery pair, but also allows rotors R(1), R(3) to share a battery(ies) if needed. Similarly, this example arrangement is able to isolate the left side channels from the right side channels, but if needed can share left side channel batteries with right side channel motors or vice versa.

FIGS. 16 and 17 represents non-limiting embodiments of described technology with eight propulsion channels for hover and one extra propulsion channel for cruise with Direct Drive and Fixed Pitch. In this configuration, eight channels and associated rotors R are used to keep the aircraft aloft, and one channel (on the tail) is used to propel the aircraft forward. FIG. 17 shows locating the pusher propeller motor (without an associated battery, since this motor is only powered when the aircraft is making forward progress) in between the left and right side channels in the ring topology so that it can be powered by left side channel batteries and/or right side channel batteries when needed. Each hover rotor R and associated motor is powered by its own battery, but the ring topology can adapt to share batteries to power adjacent rotors and to allow batteries assigned to the rotors on one side of the aircraft to power the rotors on the other side of the aircraft when needed.

FIGS. 18 and 19 represent another non-limiting embodiment of described technology with 4 propulsion channels for hover and cruise with Gearboxes and Variable Pitch (Collective). In this example, each propulsion channel also includes a gearbox that mechanically couples a pair of motors to a common rotor. In this configuration, failure of one motor can be compensated by another motor of the pair connected to the common gearbox. The electrical configuration is structured so that when a motor fails, the control logic connects both batteries of a pair to the non-failed motor of the pair; and when a battery fails, the battery is isolated and at least the non-failed battery of the pair (along with one or more other batteries as needed) is connected to the still-working motors. The ring topology thus flexibly adapts the battery supply configuration to the motor/gearbox/rotor units as needed to ensure the e-VTOL aircraft remains flying and can perform an emergency landing upon failure of any part of any channel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An electrical flight vehicle comprising:
   a plurality of motors connected to rotors; and
   a plurality of batteries used to supply electrical power to the motors,
   an improvement comprising connecting the plurality of batteries in a ring topology to provide a network of batteries that can be adaptively interconnected to compensate for component failure.

2. The vehicle of claim 1 wherein the ring topology is configured to selectively connect multiple batteries to at least one motor.

3. The vehicle of claim 1 wherein the ring topology is configured to selectively connect multiple motors to at least one battery.

4. The vehicle of claim 1 further including control logic that controls selective connections between adjacent bus bars.

5. The vehicle of claim 4 wherein the control logic further controls selective connection between bus bars and batteries.

6. The vehicle of claim 4 wherein the control logic further controls selective connection between bus bars and motors and/or motor controllers.

7. The vehicle of claim 1 wherein the ring topology connects motors/rotors on one side of the vehicle to other motors/rotors on the same side of the vehicle.

8. The vehicle of claim 1 wherein the ring topology is configured to selectively connect the plural batteries together in parallel and/or to selectively connect the plural motors together in parallel.

9. The vehicle of claim 1 wherein the ring topology is configured to selectively connect plural bus bars together, the bus bars connecting motors to batteries.

10. A method of operating an electric vertical takeoff and landing vehicle comprising adapting in the event of detected failure by:
    selectively coupling and decoupling rotor motors and/or motor controllers M1, . . . MN to bus bars B1, . . . BN;
    selectively coupling and decoupling batteries P1, . . . , PN to the bus bars B1, . . . BN; and
    selectively coupling and decoupling bus bars B1, . . . BN to one another.

11. An electric vertical takeoff and landing vehicle comprising:
    a first plurality of left side rotors;
    a first plurality of batteries connected so each battery is connected to power an associated left side rotor;
    a second plurality of right side rotors; and
    a second plurality of batteries connected so each battery is connected to power an associated right side rotor,
    wherein the first plurality of batteries are connected in a network that enables plural rotors to selectively share a battery.

12. The electric vertical takeoff and landing vehicle of claim 11 wherein the second plurality of batteries are connected in a network that enables plural rotors to share a battery.

13. The electric vertical takeoff and landing vehicle of claim 11 wherein the first and second pluralities of batteries are connected in a network that enables the first plurality of batteries to power right side rotors and vice versa.

14. The electric vertical takeoff and landing vehicle of claim 11 wherein the first plurality of rotors are coaxial.

15. The electric vertical takeoff and landing vehicle of claim 11 further including a tail rotor powered by the at least one of the first plurality of batteries and/or at least one of the second plurality of batteries.

16. The electric vertical takeoff and landing vehicle of claim 11 wherein each rotor is powered through a gearbox by a pair of motors, each motor of the pair of motors is assigned a respective battery, and the batteries assigned to the pair of motors can be switched so that the pair of batteries can power one motor of the pair upon failure of the other motor of the pair.

* * * * *